Sept. 21, 1937.    H. GOLDEN    2,093,672
GUARD FOR LEVER OPENINGS
Filed Dec. 28, 1936    2 Sheets-Sheet 1
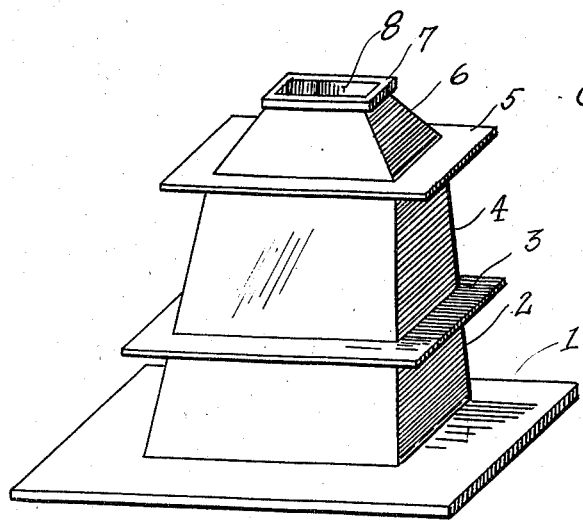
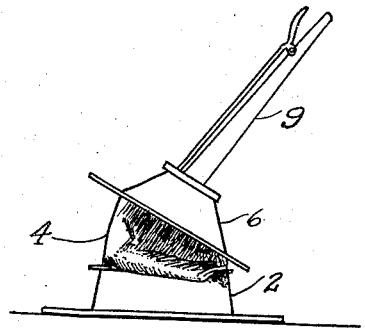
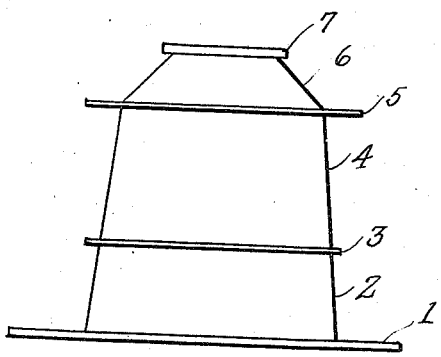
INVENTOR
HARRY GOLDEN
BY James Cottrell
ATTORNEY Sept. 21, 1937. H. GOLDEN 2,093,672
GUARD FOR LEVER OPENINGS
Filed Dec. 28, 1936 2 Sheets-Sheet 2
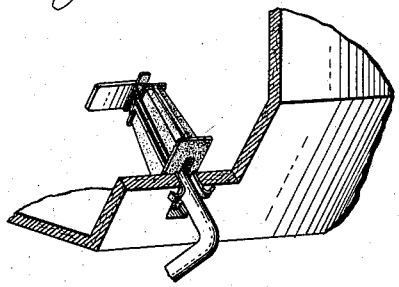
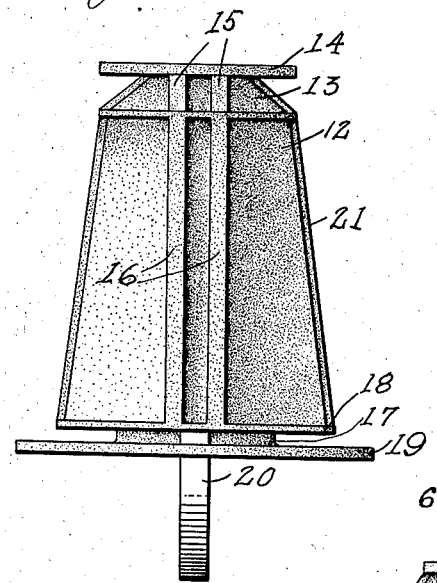
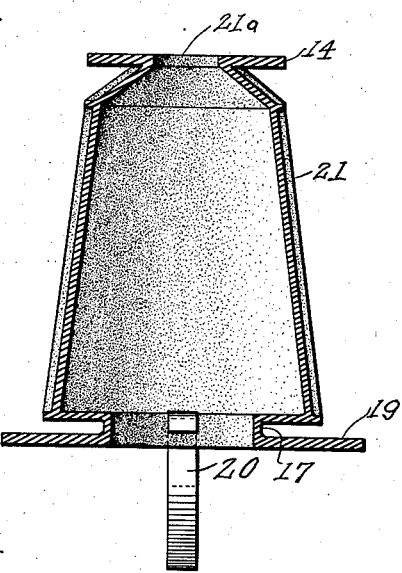
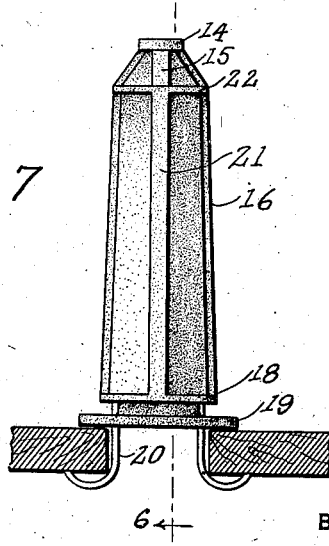
INVENTOR
Harry Golden
BY
James Cottrell
ATTORNEY Patented Sept. 21, 1937

2,093,672

UNITED STATES PATENT OFFICE 2,093,672

GUARD FOR LEVER OPENINGS

Harry Golden, New York, N. Y., assignor to Magna Products Corp., New York, N. Y.

Application December 28, 1936, Serial No. 118,003

3 Claims. (Cl. 74—566)

This invention relates to improvements in guards for lever openings such as occur in automobiles.

Heretofore, guards for openings such as those through which emergency brake levers and clutch pedals pass have been found objectionable in that no provision was made for the movements of the levers or pedals, with the result that guards soon became distorted and worn, and tend to ride up on the levers or pedals.

It is an object, therefore, of this invention to provide a guard for an emergency brake lever opening which has a collapsible central portion capable of compensating for the angular movements of the brake lever.

A further object is the provision of a guard for a clutch pedal opening which tightly fits around the clutch pedal, at the same time being provided with means preventing the guard from riding up on the clutch pedal.

These and other objects are attained by the novel construction, combination and arrangement of parts hereinafter described and shown in the accompanying drawings, constituting a material part of this disclosure, and in which:

Fig. 1 is a perspective view of a guard for an emergency brake lever opening embodying my invention.

Fig. 2 is a side elevational view of the guard shown in Fig. 1.

Fig. 3 is a side elevational view showing the manner in which the central portion of the guard collapses to accommodate angular movements of the brake lever.

Fig. 4 is a perspective view of a guard for a clutch pedal opening embodying my invention, and being a modification of that shown in Figs. 1, 2, 3.

Fig. 5 is a side elevational view of the guard shown in Fig. 4.

Fig. 6 is a sectional view of the guard taken on line 6—6 of Fig. 7.

Fig. 7 is an end view of the guard for clutch pedal openings.

Referring to the drawings, in Figs. 1, 2, 3 is shown a guard for emergency brake lever openings, which guard comprises a flat base 1, having integral therewith a frusto-conical section 2, the upper portion thereof being provided with a flange 3, to which is integrally connected a second frusto-conical section 4, the latter section 4 being made of a relatively thin, flexible and collapsible rubber. The upper edge of the section 4 is provided with a flange 5, from which projects a pyramidal section 6, having a relatively stiff bead 7 surrounding the lever opening 8.

The entire guard is made, preferably, of rubber or a substance having substantially the same characteristics. Referring to Fig. 3, it will be seen that the section 4 collapses to compensate for the various angular positions of the emergency brake lever 9, while the sections 2 and 6 remain substantially rigid and in place to effectively cover the opening in the floor to prevent air and dust from entering the automobile. By means of the bead 7, the lever 9 is tightly gripped. Without the collapsible section 4 a tight grip by means of such a bead 7 would not be effective as such a tight grip would cause the guard to ride up on the lever 9 through various angular positions thereof, and uncover the opening in the floor boards.

In Figures 4 to 7 there is shown a modified form of the invention adapted for clutch and brake pedals openings. This form of guard comprises a main body 12 connected to a frusto-conical section 13, the latter having an opening 21a at the upper end thereof surrounded by a relatively stiff flange 14. Reinforcing ribs 15 extend from the flange 14 down to a bead 22 at the upper edge of the main body, the ribs 15 being continued on into ribs 16 extending down the wide sides of the main body. The ends of the guard are also provided with similar reinforcing ribs 15 and 21, which extend down to a bead 18 at the lower edge of the main body.

The main body 12 is provided at the lower portion thereof with a neck 17 having a flat flange 19, providing a base to fit against a floor board. Fixed or embedded in the neck 17 are strips 20 of bendable metal which are designed to pass through the opening in the floor board for the pedal and be bent against the underside of the floor board, (see Fig. 7) to hold the guard to the floor board.

The pedal passes through the opening 21a and the guard is intended to tightly grip the pedal by means of the flange 14. However, it is necessary to pass the guard over the foot receiving portion of the clutch lever, and consequently flange 14 is made relatively wide and stretchable to provide a grip for the fingers in stretching the guard over the foot pedal. For the same reason the neck 17 is provided as shown to facilitate passing the guard over the foot pedal.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described my invention, what I claim is:

1. A guard for lever openings comprising a main body having beads at the upper end and lower edges thereof, a pyramidal section attached to the upper end of the main body, and relatively wide and stretchable flange surrounding an opening in the pyramidal section.

2. In a guard for lever openings, a main body having beads at the upper end lower edges thereof, a frusto-pyramidal section integral with the upper edge of said main body, a relatively wide and stretchable flange surrounding an opening in said pyramidal section, a neck of flexible and collapsible material connected to the lower portion of the main body, a flange connected to the neck, and strips of bendable metal attached to the neck.

3. The structure set forth in claim 2, being further characterized by the provision of reinforcing ribs along the sides and ends of the main body and pyramidal section.

HARRY GOLDEN.